(12) United States Patent
DiPaola et al.

(10) Patent No.: US 7,112,749 B2
(45) Date of Patent: Sep. 26, 2006

(54) SENSOR MOUNTING APPARATUS FOR MINIMIZING PARASITIC STRESS

(75) Inventors: David J. DiPaola, Attleboro, MA (US); Peter H. Frackelton, Attleboro, MA (US); David E. Hyland, Douglas, MA (US); Timothy M. McBride, Sharon, MA (US); Nathan Smith, Avon, MA (US); Chetak Reshamwala, Shrewsbury, MA (US); William S. Boyce, Foster, RI (US); Jonas M. Bautista, Somerville, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 190 days.

(21) Appl. No.: 10/875,039

(22) Filed: Jun. 23, 2004

(65) Prior Publication Data

US 2005/0284669 A1    Dec. 29, 2005

(51) Int. Cl.
*G01G 21/10* (2006.01)
*B60R 21/015* (2006.01)
(52) U.S. Cl. ............... 177/136; 177/144; 177/184; 177/DIG. 9; 180/273; 280/735; 248/548; 248/560
(58) Field of Classification Search ......... 248/548, 248/560; 177/136, 144, 184–189, 244, DIG. 9; 180/273; 280/735
See application file for complete search history.

(56) References Cited

U.S. PATENT DOCUMENTS

| | | | | |
|---|---|---|---|---|
| 4,401,290 A | * | 8/1983 | Butler | 248/565 |
| 4,411,327 A | * | 10/1983 | Lockery et al. | 177/211 |
| 4,593,727 A | * | 6/1986 | Ulveling | 141/5 |
| 4,899,840 A | * | 2/1990 | Boubille | 177/139 |
| 5,121,110 A | * | 6/1992 | Mahar et al. | 340/693.9 |
| 5,801,339 A | * | 9/1998 | Boult | 177/261 |
| 5,859,390 A | * | 1/1999 | Stafford et al. | 177/144 |
| 6,150,619 A | * | 11/2000 | Borngasser | 177/201 |
| 6,340,799 B1 | * | 1/2002 | Hama et al. | 177/238 |
| 6,362,439 B1 | * | 3/2002 | Reichow | 177/144 |

(Continued)

*Primary Examiner*—Randy W. Gibson
(74) *Attorney, Agent, or Firm*—Russell E. Baumann

(57) ABSTRACT

A compliant interface (14,16) for vehicular seat weight sensors minimizes parasitic stresses affecting sensor output. In one embodiment, an integral compliant interface (14) has an annular flange (14a) attached to a post extending from the sensor body with a first compliant member (14r) disposed between the annular flange and an upper elongated flange (14h) of a mounting bracket (14l) and a second compliant member (14s) disposed between the annular plate and a lower elongated flange (14k) to allow pivotal movement of the sensor limited by a motion stop member (14f) of annular flange (14b) engaging the lower flange. An overload cage (14u) may be placed over the sensor and attached to an additional flange (14l) to contain the sensor in the event of a failure of the mount in a catastrophic high speed crash. According to another preferred embodiment, an interface having upper and lower body members are formed with a sensor post receiving bore (16c) for attachment to the post. The body members are formed with spaced apart, radially extending face surfaces, each formed with an annular recess aligned with each other and with a compliant member received therein and fixed to the respective body members and extending beyond the face surfaces. The interface is received through a bore of a support plate to which the sensor is mounted with the compliant members engaging opposite face surfaces of the support plate allowing limited pivotal motion and with a compliant member limiting lateral movement of the interface relative to the support plate.

16 Claims, 3 Drawing Sheets

U.S. PATENT DOCUMENTS

| | | | |
|---|---|---|---|
| 6,405,991 B1 * | 6/2002 | Damiano | 248/548 |
| 6,453,747 B1 | 9/2002 | Weise et al. | |
| 6,555,765 B1 * | 4/2003 | Paine | 177/142 |
| 6,596,949 B1 * | 7/2003 | Stimpson | 177/142 |
| 6,677,539 B1 * | 1/2004 | Miura et al. | 177/136 |
| 6,924,441 B1 * | 8/2005 | Mobley et al. | 177/144 |

* cited by examiner

US 7,112,749 B2

SENSOR MOUNTING APPARATUS FOR MINIMIZING PARASITIC STRESS

CROSS REFERENCE TO RELATED APPLICATIONS

U.S. application Ser. Nos. 10/874,963 and 10/875,018 both filed Jun. 23, 2004 and both assigned to the assignee of the present invention contain subject matter related to the subject matter of this application.

FIELD OF THE INVENTION

This invention relates generally to apparatus for mounting condition responsive sensors such as force sensors and more particularly to such apparatus for minimizing parasitic stress applied to a sensor used for weighing the occupant of a vehicular seat as an input to a system used to prevent or modify airbag deployment for improved safety of the seat occupant.

BACKGROUND OF THE INVENTION

Governmental legislation requires the development of a system capable of sensing information related to front passenger seat occupants and classifying such occupants to the extent necessary to adapt airbag deployment to improve passenger safety. For example, airbag deployment can be a problem for small children or children in car seats occupying a front passenger seat. Using information provided by vehicular seat weight sensors, a control system can override the normal airbag actuation mechanism and prevent airbag deployment when such child occupies a seat having appropriate weight sensors. In other situations, airbag deployment can remain active but its intensity can be modulated in response to sensed weight information, for example, when the occupant is incorrectly positioned or is within some intermediate weight classification.

Vehicular weight sensors in such a system would be disposed, for example, between a first frame or riser attached to the chassis of the vehicle and a second frame that supports the seat. In the case of movably mounted passenger seats, the second frame typically comprises an upper track adjustably movable on a lower track with the seat structure mounted on the upper track. Sensors can also be mounted between an upper track and a side member.

An example of a suitable weight sensor is shown and described in copending application Ser. No. 10/874,963 filed Jun. 23, 2004 claiming the benefit of Provisional Application No. 60/491,417, filed Jul. 31, 2003 and assigned to the assignee of the instant invention, the subject matter of which is incorporated herein by this reference. Such weight sensors have, inter alia, a first body formed with a sense surface on which strain sensors are disposed and have a mounting post extending away from the first body. A second body is provided with a tubular wall, the distal free end of which is attached to the first body around the perimeter of the sense surface and has a second mounting post extending away from the second body in a direction opposite that of the post of the first body generally along a common longitudinal axis. Essentially, weight is transmitted as a force to the first body creating a strain on the sense surface.

Performance of the weight sensors of the type described in the above referenced application is directly related to parasitic loads at the interface of the sensors with surrounding components such as the track, riser and the like. By way of example, the tracks on opposite sides of the seat may be somewhat out of parallel with each other even when they are within specified tolerances and this can place a moment on the sensors creating a parasitic stress that affects the sensor output.

SUMMARY OF THE INVENTION

It is an object of the invention to provide mounting apparatus for a force responsive sensor that will minimize parasitic stress that affects sensor output. It is another object of the invention to provide a stress reducing sensor mounting apparatus that is sufficiently robust to maintain crash worthiness as well as meeting noise/vibration requirements of the seat structure, limited movement criteria and other performance characteristics of the vehicle seat.

Briefly described in accordance with the invention, a sensor having a mounting post extending therefrom along a longitudinal axis is provided with a compliant member disposed around the post allowing limited pivotal motion in the x and y directions relative to the longitudinal axis extending in the z direction.

According to a first preferred embodiment of the invention, an integral compliant interface to decouple parasitic mechanical loads between the vehicle seat structure and the sensor body comprises two low spring rate compliant members such as elastomeric O-rings, springs or the like, disposed on opposite face surfaces of an annular flange fixedly attached to the sensor post, preferably by welding thereto. A bracket comprising elongated upper and lower aligned flanges is provided with mounting holes at either end to facilitate attachment by bolts or the like to a support such as a riser attached to the chassis of the vehicle. An opening is formed in a central portion of at least the upper flange to receive the post of the sensor. The elongated flanges are separated from each other adjacent to the opening to provide a chamber for receipt of the annular flange and the compliant members with the compliant members engaging the respective elongated upper and lower flanges. The annular flange is preferably provided with a surface portion that extends downwardly toward, but normally is separated from, the elongated lower flange to serve as a stop member limiting the amount of pivotal movement of the sensor and concomitant compression of the compliant members. If desired, the bracket can be formed with an additional upper flange configured as a cage extending over the sensor body to provide an overload function.

According to a second preferred embodiment, a compliant interface to decouple parasitic mechanical loads between the vehicular seat structure and the sensor body comprises upper and lower body members each having a sensor post receiving bore fixedly connected to the sensor post with each body member formed with a radially extending annular flange, the two flanges being spaced from each other. The radially extending surface of each flange facing each other is formed with a respective annular recess aligned with each other. A compliant, low spring rate O-ring of elastomeric material, bellview washer or the like, is seated in each recess and is preferably fixed to the respective body member. Each compliant member extends in the direction of the longitudinal axis of the post receiving bore beyond the radially extending surface of the flange in which it is seated but is spaced from the corresponding compliant member in the other body member by a selected distance. A longitudinally extending sleeve portion of at least one body member is received through a bore of a support wall such as a riser having a selected thickness greater than the selected distance between the respective compliant members, the spaced apart flanges and the compliant material being disposed on opposite face surfaces of the support wall with the compliant material engaging opposite face surfaces of the support wall and preferably with a portion of the compliant material engaging the cylindrical surface of the bore of the support wall. According to a feature of this embodiment, the facing outer edges of the recesses serve as stop surfaces limiting the pivotal movement of the sensor body in the x and y directions.

BRIEF DESCRIPTION OF THE DRAWINGS

Other objects and features of the invention will become apparent by reference to the following detailed description of preferred embodiments when considered in connection with the accompanying drawings wherein.

DETAILED DESCRIPTION OF PREFERRED EMBODIMENTS

Figure 1:
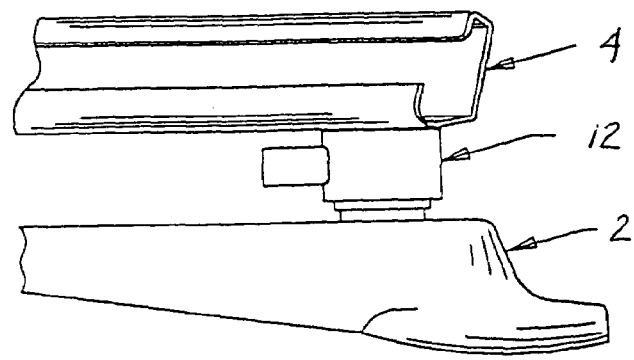
FIG. 1 is a broken away perspective view of an occupant weight sensor disposed between a frame fixed to a vehicle chassis and a lower track for movable receipt of an upper seat supporting track.

FIG. 1 shows one possible placement of an occupant weight sensor for use in a vehicle. Occupant weight sensor 12 is shown mounted between a first, broken away frame 2 for fixed attachment to the chassis of a vehicle and a second, seat support frame 4. It will be understood that the sensor could also be mounted at other locations, such as above seat track frames, i.e., between an upper track and a pan frame.

Figure 2:
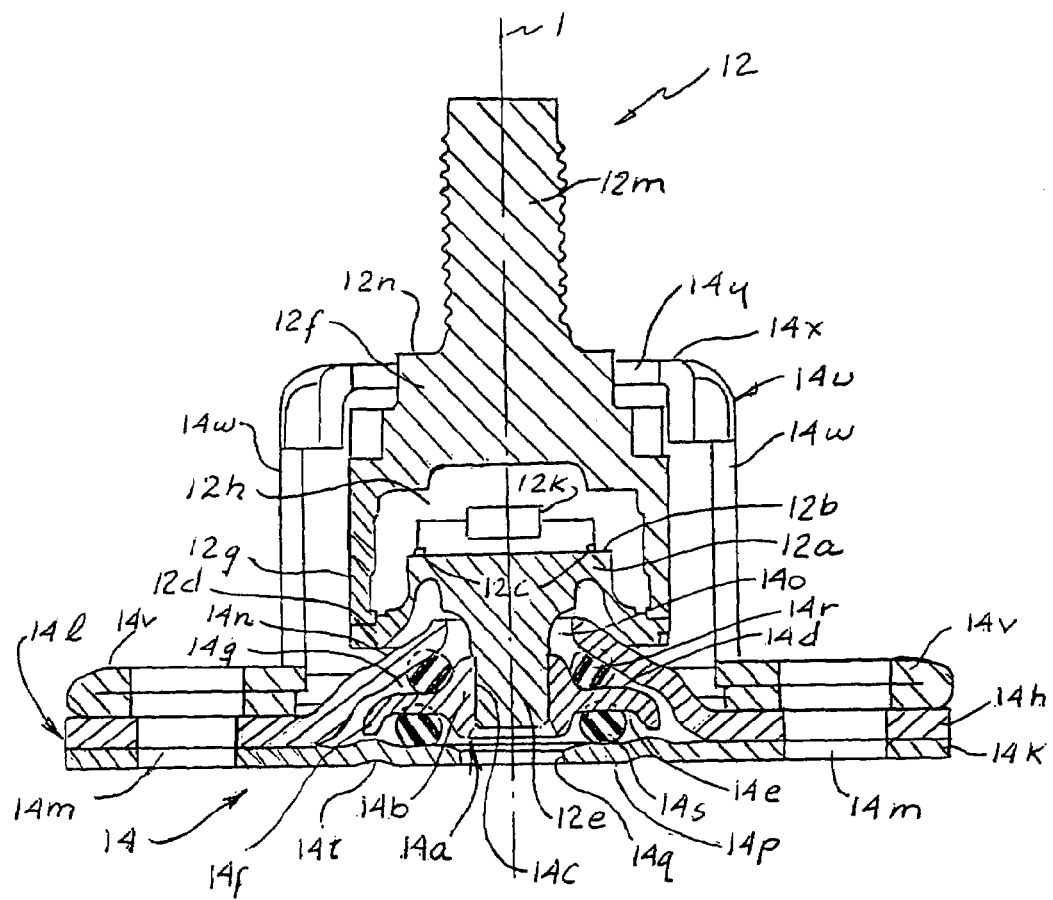
FIG. 2 is a cross sectional, elevational view of mounting apparatus for a vehicular seat weight sensor made in accordance with a preferred embodiment of the invention.
Figure 3:
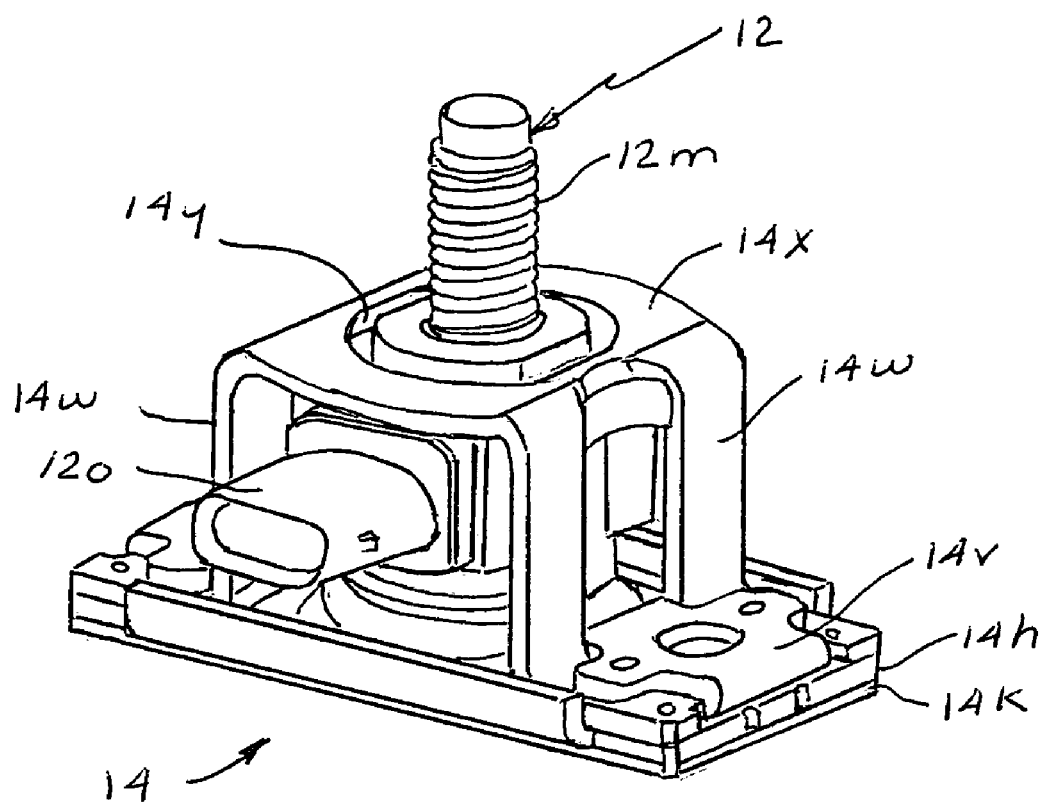
FIG. 3 is a perspective view of the FIG. 2 structure.

Sensor 12, shown in FIG. 1, is of the type shown in FIG. 1a of copending, coassigned application Ser. No. 10/874, 963 referenced above. With reference to FIGS. 2 and 3, sensor 12 comprises a first body 12a of suitable material such as stainless steel having a sense surface 12b on which suitable sensors 12c are disposed. First body 12a is formed with an annular, radially extending flange surface 12d around the periphery of the sense surface and a post 12e extending away from body 12a along a longitudinal axis 1.

A second body 12f of suitable material such as stainless steel is formed with a tubular sleeve 12g which is received on radially extending flange surface 12d and fixedly attached thereto, as by welding. A cavity 12h is formed within the sleeve portion 12g in which suitable signal conditioning electronics 12k are disposed. Suitable electrical connections (not shown) for power and for the output signals extend from the cavity through an opening in sleeve portion 12g via a connector shroud 12o (FIG. 3). Second body 12f is formed with a post 12m extending away from body 12f along longitudinal axis 1 in a direction opposite to that of post 12e.

Posts 12e and 12m are used to mount sensor 12 to frames 2 and 4 respectively as illustrated in FIG. 1 and the force exerted on the sensor caused by the seat structure and any occupant in the seat is transferred between sleeve portion 12g and radially extending flange surface 12d and generates a stress on sensing surface 12b. This stress is sensed by sensors 12c to provide an output conditioned by signal conditioning electronics 12k. Further details of the sensor can be had by reference to copending application Ser. No. 10/874,963 referenced above.

The performance of sensor 12 is directly related to loading, the surrounding environment, parasitic loads developed within the sensor and the interface of the sensor with surrounding components such as tracks or other supporting structure. For optimum performance, it is important to minimize parasitic stresses that affect sensor output.

In accordance with the first preferred embodiment shown in FIGS. 2 and 3, an integral compliant interface 14 is provided to decouple parasitic mechanical loads between the seat structure and the sensor body. A flange 14a of suitable metallic material is formed with a hub 14b having a post receiving bore 14c. The configuration of flange 14a as shown in the drawing is annular although various other shapes could be used, if desired. Upper and lower annular seating surfaces 14d, 14e respectively are formed around hub 14b and at the outer periphery of flange 14a a downwardly extending portion 14f is preferably formed to serve as a pivotal motion stop member. Portion 14f may be formed with a continuous stop surface or with radially spaced portions around the periphery, as desired. Post 12e of sensor 12 is received in bore 14c of flange 14a and fixed thereto, preferably by welding. Although stop member 14f is shown as extending from the outer periphery of annular flange 14a, it will be understood that, if desired, the stop member could be located elsewhere, such as on the inner portion of the annular flange or hub 14b.

Post 12e and annular flange 14a are received in a chamber 14g, to be discussed, formed by upper and lower elongated flanges 14h, 14k respectively of a bracket 14l. Bracket 14l is elongated to provide mounting bores 14m at opposite ends thereof for attachment to a support, such as a frame attached to the chassis of a vehicle. Upper flange 14h has a centrally located, generally conically shaped portion 14n and is formed with a bore 14o at the center at the location where the vertex of the conical configuration would be. Bore 14o is sized to receive post 12e in spaced apart relation allowing pivotal movement of the post in the x and y directions relative to the longitudinal axis 1, or z direction. The conical shaped portion 14n forms chamber 14g along with lower elongated flange 14k. The conical shaped portion 14n is vertically aligned with upper seat surface 14d and the lower elongated flange 14k has a surface portion 14p vertically aligned with lower seat surface 14e of annular flange 14a. Lower elongated flange 14k is shown with an optional centrally located bore 14q.

A first compliant member, such as elastomeric O-ring 14r is received on upper seating surface 14d in engagement with conical shaped portion 14n and a second compliant member, such as elastomeric O-ring 14s is received between and in engagement with both lower annular seating surface 14e and the vertically aligned portion 14p of lower elongated flange 14k.

This arrangement allows sensor 12 to pivot in the x and y directions with respect to longitudinal axis 1, or z direction, to prevent or substantially reduce sensor bending when parasitic stress is applied to the post. The pivotal motion stop member 14f is spaced a selected distance from lower elongated flange 14k to limit the amount of pivotal motion permitted. The distance between stop member 14f and lower elongated flange 14k can be adjusted by deforming the flange at 14t as desired. Protrusions 14t also serve to limit horizontal movement of annular flange 14a and elastomeric o-ring 14s.

If desired, bracket 14l can be provided with an additional flange 14u having first and second base portions 14v each formed with a bore 14m for alignment with bores 14m in upper and lower elongated flanges 14h, 14k. A pair of legs 14w extend upwardly from each base portion and are integrally connected to a top wall 14x spaced slightly below surface 12n of sensor 12. Top wall 14x is formed with an opening 14y which is large enough to allow pivotal movement of the sensor within the limits formed by stop member 14f but smaller than the outer envelope of sensor 12 to serve as an overload protection cage to prevent separation of the sensor from the mount and consequent dislocation of the seat in the event of a catastrophic high speed crash or the like due, for example, to a failure of the weld connection between post 12m and annular flange 14a. It will be understood that if desired, cage 14u could also be used to limit pivotal motion instead of stop member 14f engaging lower elongated flange 12k.

Figure 4:
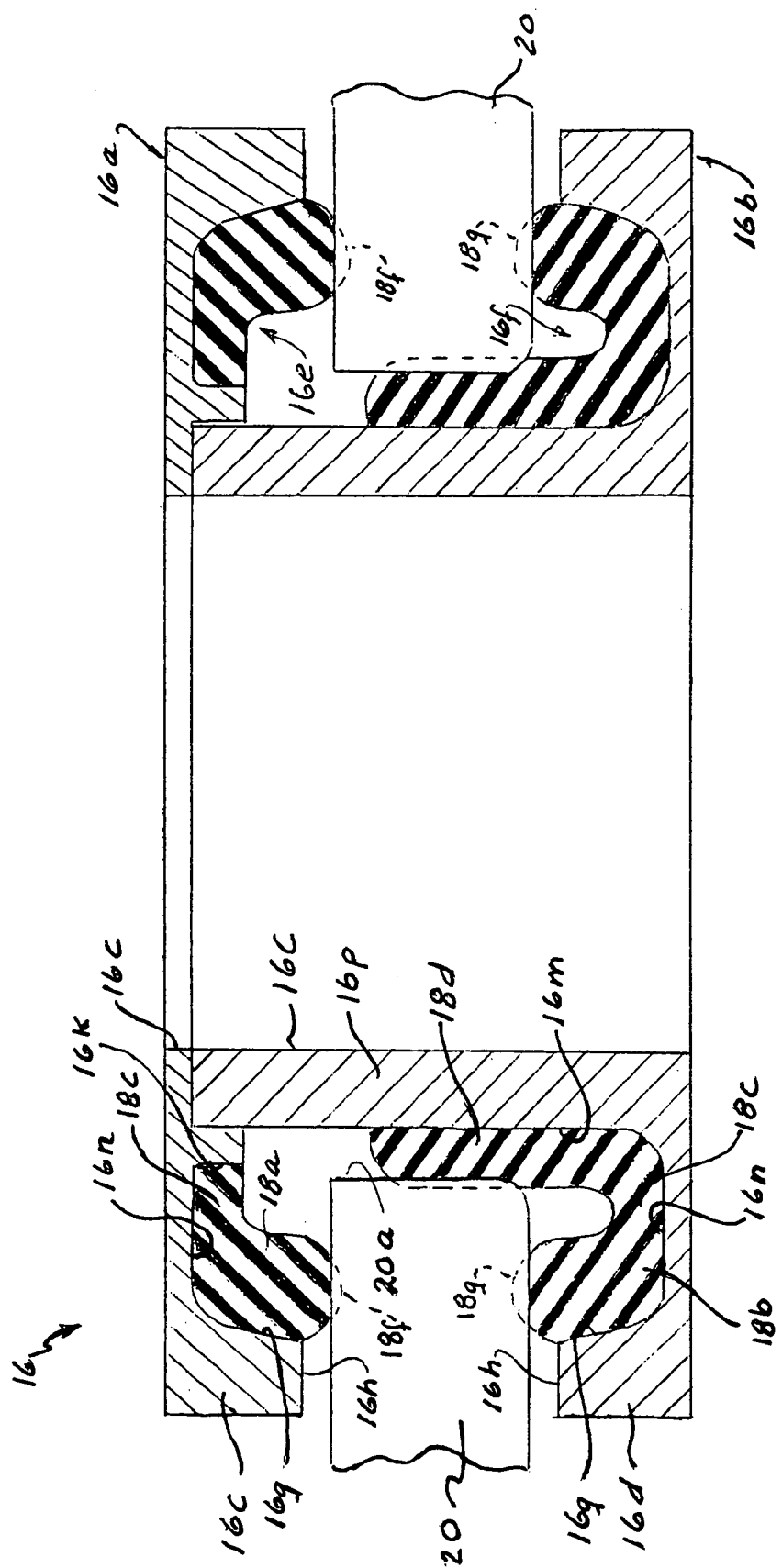
FIG. 4 is a cross sectional, elevational view of a mounting apparatus for a vehicular seat weight sensor made in accordance with another preferred embodiment of the invention.

A compliant interface 16 to decouple parasitic mechanical loads between the vehicle seat structure and the sensor body made in accordance with a second preferred embodiment is shown in FIG. 4. Compliant interface 16 comprises upper and lower body members 16a, 16b of suitable material such as stainless steel, each having a bore 16c sized for reception of a post member, such as post 12m of a force sensor such as sensor 12 shown in FIG. 2. At least one of body members 16a, 16b is formed with a longitudinally extending sleeve portion 16p and each body member has a radially extending flange 16c, 16d, respectively, formed with aligned, facing annular recesses 16e, 16f, respectively. Each annular recess is defined by a radially extending back wall 16n, an outboard side wall 16g, and an inboard side wall 16k for recess 16e and 16m for recess 16f. A compliant member, such as an elastomeric O-ring 18a, 18b is received in each respective recess and preferably is bonded to the steel surface forming the recesses. The O-rings extend beyond the facing surfaces 16h of the flanges and are spaced from each other a distance chosen to be slightly less than the thickness of a support member to which interface 16 is mounted, such as riser 20. Preferably, the outboard side walls 16g of recesses 16e, 16f serve as mechanical stops for the elastomeric material and ultimately serve to limit pivotal motion of a sensor. Outboard side walls 16g are inclined from back wall 16n in a direction away from the longitudinal axis of the recess up to face surface 16h to enhance structural strength and allow the flow of elastomeric material while being able to bottom out to prevent excessive load on the elastomeric material itself. Side walls 16g are inclined preferably at an angle on the order of 10–20 degrees and extend beyond the base portion 18c of the O-rings up to flange surfaces 16h. This mechanical stop arrangement protects the elastomer from a low speed crash event and further prevents complete failure during a high speed crash event.

When compliant interface 16 is mounted in bore 20a of a support, such as riser 20, and a sensor post, such as post 12m shown in FIG. 2, is received in bore 16c and a fastener such as a nut (not shown) is attached, the o-rings are compressed the amount indicated by the dashed lines at 18f, 18g. The preload from the fastener is taken up by sleeve portion 16p along with upper member 16a. The center portion 18d of O-ring 18b forms a longitudinally extending sleeve portion which serves to prevent horizontal or lateral movement of the interface relative to riser 20.

The distance between the flange face surfaces 16h of members 16a, 16b, relative to the thickness of riser 20, allows a selected degree of pivotal movement of the sensor, generally on the order of 2–4 degrees.

The particular shape of body member 16a, 16b is a matter of choice, however, the provision of body member 16b with a major longitudinally extending sleeve portion, such as portion 16p shown, facilitates the mounting of sleeve portion 18d of elastomeric O-ring 18b. Body members 16a, 16b are fixed to each other in any suitable manner. As noted above, compliant interface 16 is received on a sensor post such as post 12m of FIG. 1 and retained thereon by a suitable nut (not shown). Although two spaced elastomeric members are shown and described, it is within the purview of the invention to combine these into a single member. Further, if desired, means other than bonding for retaining the elastomer O-rings in their seats can be employed, such as by using mechanical means.

It should be understood that although particular preferred embodiments of the invention have been described by way of illustrating the invention, other embodiments are also possible. For example, compliant members other than elastomeric can be used, such as springs or bellview washers. The invention includes all modifications and equivalents of the disclosed embodiments falling within the scope of the appended claims.

What is claimed is:

1. A weight sensor comprising a body and first and second posts extending outwardly in opposite directions from the body generally along a common longitudinal axis, one of the posts mounted to an object whose weight is to be sensed and the other post being mounted to a support, an integral interface for decoupling parasitic mechanical loads between the object and the sensor including a compliant member seating flange having a bore, one of the posts received through the bore with the compliant member seating flange rigidly attached to the said one of the posts, the compliant member seating flange having upper and lower surfaces, the upper and lower surfaces each formed with a seating surface, a bracket having an upper flange formed with a bore which receives therethough the said one of the posts, and a lower flange, the upper and lower flanges having portions aligned with the respective seating surfaces and having spaced apart bores for receipt of mounting fasteners, and first and second compliant members received on the respective compliant member seating surfaces and engaging respective aligned portions of the upper and lower flanges allowing pivotal motion of the sensor about the interface in response to a bending force applied to the other post.

2. A weight sensor according to claim 1 in which the compliant member seating flange is annular in configuration and the seating surfaces of the annular compliant member seating flange and the compliant members are annular.

3. A weight sensor according to claim 2 in which the compliant members are formed of elastomeric material.

4. A weight sensor according to claim 2 in which the annular flange has a downwardly extending stop member spaced a selected distance from the lower flange to limit pivotal motion of the sensor body.

5. A weight sensor according to claim 4 in which the stop member on the annular compliant member seating flange extends around the periphery of the annular compliant member seating flange.

6. A weight sensor according to claim 4 in which the stop member is disposed at a plurality of locations around the periphery of the annular compliant member seating flange.

7. A weight sensor according to claim 1 in which the upper flange is formed with a generally conical portion to form a chamber for receipt of the annular compliant member seating flange and compliant members.

8. A weight sensor according to claim 1 in which the compliant member seating flange is welded to the said one of the posts.

9. A weight sensor according to claim 1 further comprising an overload protection cage attached to the bracket and having stop surfaces spaced from the sensor a selected distance to prevent separation of the sensor from the bracket in case of catastrophic crash event of a vehicle in which the sensor is mounted or a catastrophic overload applied to the sensor.

10. A compliant interface for a sensor having a post extending from a sensor body for allowing limited pivotal motion of the sensor relative to a support plate comprising:
   first and second body members formed with a sensor post receiving bore and attached to each other, the bore having a longitudinal axis, each body member having a laterally extending flange forming a face surface facing each other and spaced from each other by a first selected distance,
   a recess formed in each face surface aligned with each other,
   a compliant member received in each recess and extending toward each other beyond the face surface to form a selected longitudinally extending gap of a selected distance less than the first selected distance,
   at least one of the body members having a longitudinally extending sleeve extending toward the other body member,
   compliant material disposed on the sleeve about the circumference thereof and aligned with at least a portion of the gap so that a support plate having a thickness between the first and second selected distances can be received between the compliant members when the compliant interface is received in a bore of a support plate allowing limited pivotal motion between the support plate and the first and second body members and with the compliant material on the sleeve limiting lateral movement of the compliant interface relative to the support plate.

11. A compliant interface according to claim 10 in which the compliant members are elastomeric.

12. A compliant interface according to claim 11 in which the elastomeric members are bonded to the respective first and second body members.

13. A compliant interface according to claim 10 in which each recess is annular and has a longitudinal axis, an inboard and an outboard side wall and a radially extending back wall, the outboard side wall is inclined from the radially extending back wall away from the longitudinal axis of the annular recess up to the face surface.

14. A compliant interface according to claim 10 in which the compliant material disposed on the sleeve is integrally formed with one of the compliant members.

15. A sensor comprising a body having a post extending outwardly from the body along a longitudinal axis, a bracket for mounting the post to a support, and an integral interface including a compliant member interposed between the bracket and the post allowing pivotal motion of the post about the interface within a selected range of angles relative to the longitudinal axis.

16. A sensor according to claim 15 in which the bracket has a wall portion and further comprising a stop surface attached to the post, the stop surface spaced a selected distance from the wall portion of the bracket so that the stop surface engages the wall portion upon a selected amount of pivotal movement of the post.

\* \* \* \* \*